(12) United States Patent
Chung et al.

(10) Patent No.: US 8,608,367 B2
(45) Date of Patent: Dec. 17, 2013

(54) SCREW EXTRUDER FOR CONTINUOUS AND SOLVENT-FREE RESIN EMULSIFICATION

(75) Inventors: Joo T. Chung, Webster, NY (US); Fumii Higuchi, Mississauga, CA (US); Santiago Faucher, Oakville, CA (US); Joseph L. Leonardo, Penfield, NY (US); Brian Andaya, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 310 days.

(21) Appl. No.: 12/782,893

(22) Filed: May 19, 2010

(65) Prior Publication Data

US 2011/0286296 A1    Nov. 24, 2011

(51) Int. Cl.
| | | |
|---|---|---|
| B01F 3/00 | (2006.01) | |
| B01F 7/08 | (2006.01) | |
| B29B 7/42 | (2006.01) | |
| B29B 7/48 | (2006.01) | |

(52) U.S. Cl.
USPC ............................................. 366/81; 366/319

(58) Field of Classification Search
USPC ...................... 366/79, 81, 319, 321
See application file for complete search history.

(56) References Cited

U.S. PATENT DOCUMENTS

| | | | |
|---|---|---|---|
| 3,590,000 A | 6/1971 | Palermiti et al. | |
| 3,655,374 A | 4/1972 | Palermiti et al. | |
| 3,720,617 A | 3/1973 | Chatterji et al. | |
| 3,751,014 A * | 8/1973 | Waterloo | 366/79 |
| 3,752,489 A * | 8/1973 | Latinen | 277/350 |
| 3,797,550 A * | 3/1974 | Latinen | 159/2.2 |
| 3,944,493 A | 3/1976 | Jadwin et al. | |
| 3,971,732 A * | 7/1976 | Meier | 422/159 |
| 3,983,045 A | 9/1976 | Jugle et al. | |
| 4,007,293 A | 2/1977 | Mincer et al. | |
| 4,079,014 A | 3/1978 | Burness et al. | |
| 4,243,779 A * | 1/1981 | McAlister | 525/462 |
| 4,243,784 A * | 1/1981 | Akima et al. | 526/88 |
| 4,265,990 A | 5/1981 | Stolka et al. | |
| 4,298,322 A * | 11/1981 | Anders et al. | 425/147 |
| 4,350,663 A * | 9/1982 | McAlister | 422/137 |
| 4,394,430 A | 7/1983 | Jadwin et al. | |
| 4,560,635 A | 12/1985 | Hoffend et al. | |
| 4,563,408 A | 1/1986 | Lin et al. | |
| 4,584,253 A | 4/1986 | Lin et al. | |
| 4,590,033 A * | 5/1986 | Chapet | 419/9 |
| 4,776,784 A * | 10/1988 | Batiuk | 425/203 |
| 4,858,884 A | 8/1989 | Harwath | |
| 4,875,847 A * | 10/1989 | Wenger et al. | 425/204 |
| 4,935,326 A | 6/1990 | Creatura et al. | |
| 4,937,166 A | 6/1990 | Creatura et al. | |
| 4,954,303 A * | 9/1990 | Moore et al. | 264/101 |
| 5,227,460 A | 7/1993 | Mahabadi et al. | |
| 5,278,020 A | 1/1994 | Grushkin et al. | |
| 5,283,021 A * | 2/1994 | Shih | 264/102 |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |

(Continued)

Primary Examiner — Tony G Soohoo
(74) Attorney, Agent, or Firm — MDIP LLC

(57) ABSTRACT

A screw extruder is presented including a feed hopper for receiving materials and a body member having at least one supply port and at least one outlet port. The screw extruder also includes a screw positioned within the body member and movable along a channel defining a longitudinal axis. The screw extruder further includes a drive shaft for rotatably driving the screw along the channel. The screw extruder may be configured to mix the materials received via the feed hopper with a series of one or more forward, neutral, and reverse kneading elements.

18 Claims, 9 Drawing Sheets

(56) References Cited

U.S. PATENT DOCUMENTS

| | | | |
|---|---|---|---|
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,650,255 A | 7/1997 | Ng et al. | |
| 5,650,256 A | 7/1997 | Veregin et al. | |
| 5,749,649 A * | 5/1998 | Schobert-Csongor et al. | 366/76.4 |
| 5,853,943 A | 12/1998 | Cheng et al. | |
| 5,908,592 A * | 6/1999 | Kimura et al. | 264/102 |
| 5,951,159 A * | 9/1999 | Schobert-Csongor et al. | 366/76.4 |
| 6,004,714 A | 12/1999 | Ciccarelli et al. | |
| 6,063,827 A | 5/2000 | Sacripante et al. | |
| 6,116,770 A * | 9/2000 | Kiani et al. | 366/82 |
| 6,116,771 A * | 9/2000 | Andersen | 366/85 |
| 6,170,975 B1 * | 1/2001 | Andersen | 366/82 |
| 6,190,815 B1 | 2/2001 | Ciccarelli et al. | |
| 6,305,838 B1 * | 10/2001 | Affeldt et al. | 366/349 |
| 6,593,049 B1 | 7/2003 | Veregin et al. | |
| 6,613,128 B1 * | 9/2003 | Simonaru et al. | 95/260 |
| 6,756,176 B2 | 6/2004 | Stegamat et al. | |
| 6,783,270 B1 * | 8/2004 | Padmanabhan | 366/82 |
| 6,830,860 B2 | 12/2004 | Sacripante et al. | |
| 7,188,992 B2 * | 3/2007 | Mattingly, Jr. | 366/82 |
| 7,893,307 B2 * | 2/2011 | Smith | 585/241 |
| 2005/0024986 A1 * | 2/2005 | Mattingly, Jr. | 366/82 |
| 2006/0286478 A1 * | 12/2006 | Chung et al. | 430/109.1 |
| 2007/0141494 A1 | 6/2007 | Zhou et al. | |
| 2007/0147169 A1 * | 6/2007 | Mattingly, Jr. | 366/82 |
| 2007/0177451 A1 * | 8/2007 | Benjamin et al. | 366/82 |
| 2010/0103763 A1 * | 4/2010 | Ponzielli | 366/76.6 |
| 2011/0042841 A1 * | 2/2011 | Wildi et al. | 264/13 |
| 2011/0063940 A1 * | 3/2011 | Padmanabhan | 366/82 |
| 2011/0133355 A1 * | 6/2011 | Takita et al. | 264/49 |

\* cited by examiner

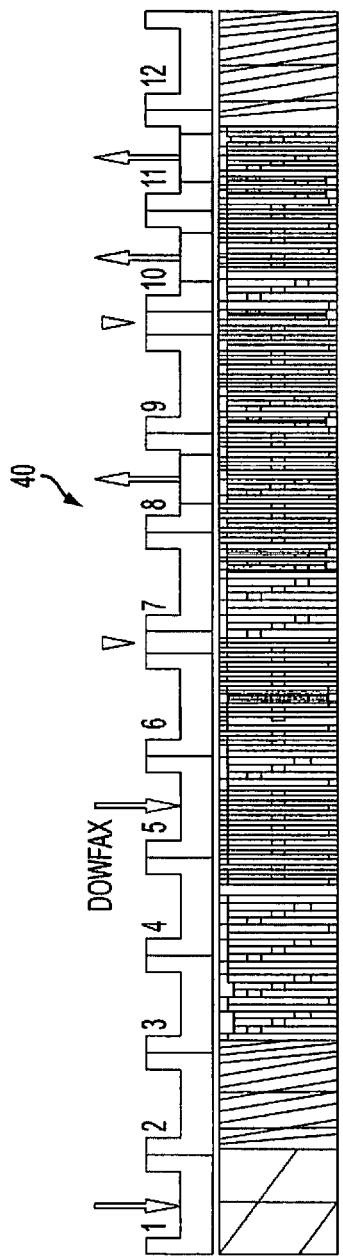
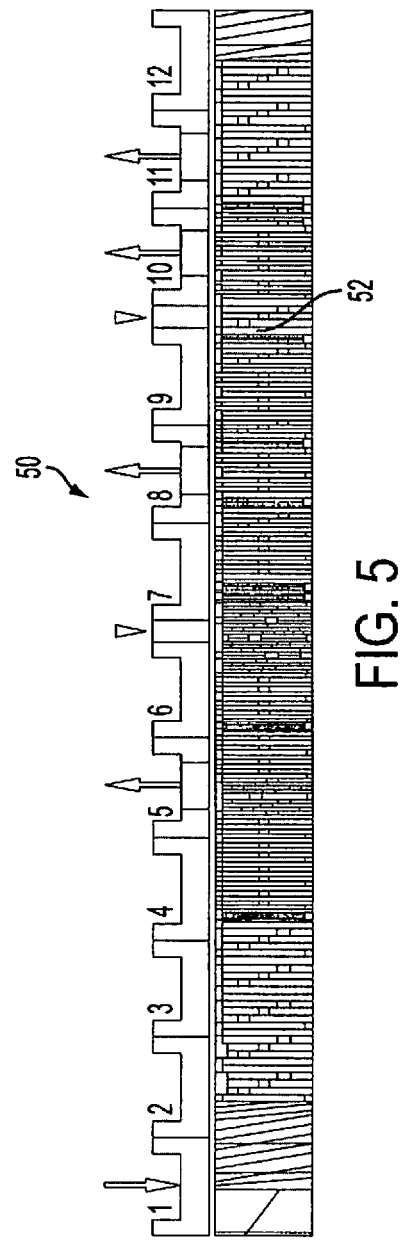
FIG. 4
FIG. 5

SCREW EXTRUDER FOR CONTINUOUS AND SOLVENT-FREE RESIN EMULSIFICATION

BACKGROUND

The present disclosure relates to a screw extruder configuration for preparing latex emulsions and toners. More specifically, continuous processes for polymerization of a polyester utilizing a polycondensation reaction and continuous processes for emulsification of the polyester, colloidal suspension, utilizing neutralization reaction are described.

Processes for forming toner compositions for use with electrophotographic print or copy devices have been previously disclosed. For example, methods of preparing an emulsion aggregation (EA) type toner are known and toners may be formed by aggregating a colorant with a latex polymer formed by batch or semi-continuous emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,290,654, 5,278,020, 5,308,734, 5,370,963, 5,344,738, 5,403,693, 5,418,108, 5,364,729, 5,346,797, the disclosures of each of which are hereby incorporated by reference in their entirety. Other processes are disclosed in U.S. Pat. Nos. 5,348,832, 5,405,728, 5,366,841, 5,496,676, 5,527,658, 5,585,215, 5,650,255, 5,650,256 and 5,501,935, the disclosures of each of which are hereby incorporated by reference in their entirety.

As noted above, latex polymers utilized in the formation of EA type toners may be formed by batch or semi-continuous emulsion polymerization. Batch processes for producing resins may be subjected to bulk polycondensation polymerization in a batch reactor at an elevated temperature. The time required for the polycondensation reaction is long due to heat transfer of the bulk material, high viscosity, and limitations on mass transfer. The resulting resin is then cooled, crushed, and milled prior to being dissolved into a solvent. The dissolved resin is then subjected to a phase inversion process where the polyester resin is dispersed in an aqueous phase to prepare polyester latexes. The solvent is then removed from the aqueous phase by a distillation method.

The use of solvents in this process may cause environmental concerns. For example, if the solvent level is not low enough (<50 ppm), extensive waste water treatment and solvent remediation may be required.

In addition, where a batch process is utilized, because the individual batch process involves the handling of bulk amounts of material, each process takes many hours to complete before moving to the next process in the formation of the toner, that is, aggregation and/or coalescence. In addition, batch-to-batch consistency is frequently difficult to achieve because of variations that may arise from one batch to another.

It would be advantageous to provide a screw extruder configuration for the preparation of a latex resin suitable for use in a toner product that is more efficient, takes less time, results in a consistent toner product, and is environmentally friendly.

SUMMARY

The present disclosure provides for a screw extruder. The screw extruder includes a feed hopper for receiving materials, a body member having at least one supply port and at least one outlet port, and a screw positioned within the body member and movable along a channel defining a longitudinal axis. The screw extruder also includes a drive shaft for rotatably driving the screw along the channel. The screw extruder is configured to mix the materials received via the feed hopper with a series of one or more forward, neutral, and reverse kneading elements.

In additional embodiments, the screw extruder is used for emulsification of crystalline resins. However, in other embodiments, the screw extruder is used for emulsification of amorphous resins.

The screw extruder may mechanically cooperate with a 2-lobe machine or a 3-lobe machine. The screw extruder may produce a latex emulsion in a continuous and solvent-less emulsification process. Moreover, the screw extruder may produce latex by way of a continuous polycondensation reaction phase followed by emulsifying a resin into an aqueous phase, where each phase involves separate kneading elements.

In yet another embodiment, the kneading elements lengthen a residence time of colloidal dispersion within the screw extruder, and the kneading elements promote intense dispersive mixing and lengthen a residence time to provide for accelerated reactions between the materials.

The screw extruder may provide for at least a polycondensation process, a neutralization process, and an emulsification process. In example embodiments, rotation of the screw facilitates mixing of the materials for the polycondensation stage and travel of the materials through the channel.

The at least one supply port is configured to receive the materials at a controlled rate. The at least one outlet port is connected to a condenser for removing water vapor and nitrogen from the channel. The drive shaft is connected to a motor and the extruder spins at a rate of from about 50 rpm to about 1500 rpm.

The present disclosure provides for a screw extruder configured for emulsification of resins. The screw extruder includes a feed hopper for receiving at least NaOH and resin and a flexible, elongated body member having at least one supply port and at least one outlet port, the at least one supply port configured to receive the NaOH and resin at a controlled rate, and the at least one outlet port configured to be connected to a condenser. The screw extruder also includes a screw positioned within the body member and movable along a channel defining a longitudinal axis, wherein rotation of the screw facilitates mixing of the NaOH and resin for a polycondensation stage and a motor for rotatably driving the screw along the channel. The screw extruder is configured to mix the NaOH and resin received via the feed hopper with a series of one or more forward, neutral, and reverse kneading elements.

In embodiments, a method of the present disclosure may include producing latex emulsion in a continuous and solvent-less emulsification process. The method may include the steps of feeding materials into a feed hopper of a screw extruder at a controlled rate, the screw extruder having a screw rotatably driven by a drive shaft along a channel; melting the materials via dissipative mixing in the channel of the screw extruder; injecting a first quantity of water to the materials melted and mixed together; mixing the materials with a first series of one or more forward, neutral, and reverse kneading elements; injecting a second quantity of water; applying a second series of kneading elements; and recovering a colloidal dispersion via an outlet port of the screw extruder.

BRIEF DESCRIPTION OF THE DRAWINGS

Various embodiments of the present disclosure will be described herein below with reference to the figures wherein:

FIG. 4 schematically shows a screw extruder configuration for a 2-lobe machine for emulsification;

FIG. 5 schematically shows a screw extruder configuration for a 2-lobe machine for emulsification, in accordance with a second embodiment of the present disclosure;

DETAILED DESCRIPTION OF EMBODIMENTS

The present disclosure provides processes for producing resins suitable for use in forming toner compositions. The processes are continuous and solvent-free. In embodiments, neutralization agents may be utilized in the process to accelerate emulsification of the polyester that is produced from continuous condensation polymerization, which may then be utilized to form a polyester emulsion. The resulting resin, in embodiments, may be suitable to form toner.

Processes for making toner compositions in accordance with the present disclosure include a continuous emulsion polymerization and continuous solvent free emulsification process (schematically illustrated in FIG. 10) to provide a latex emulsion in one continuous process, which may then be utilized to produce a toner. The process may occur without the use of a solvent.

At least one screw extruder may be utilized to form the latex. "At least one" may refer, in embodiments, for example, to from about 1 to about 10, in embodiments from about 2 to about 9, in embodiments from about 3 to about 6. In some embodiments, two screw extruders may be utilized to produce a latex.

In embodiments, the process may include three different stages: polycondensation, neutralization and emulsification. In other embodiments, where a pre-made polyester is utilized, the polycondensation step may be omitted and the process may include neutralization and emulsification.

Polycondensation

Figure 10:
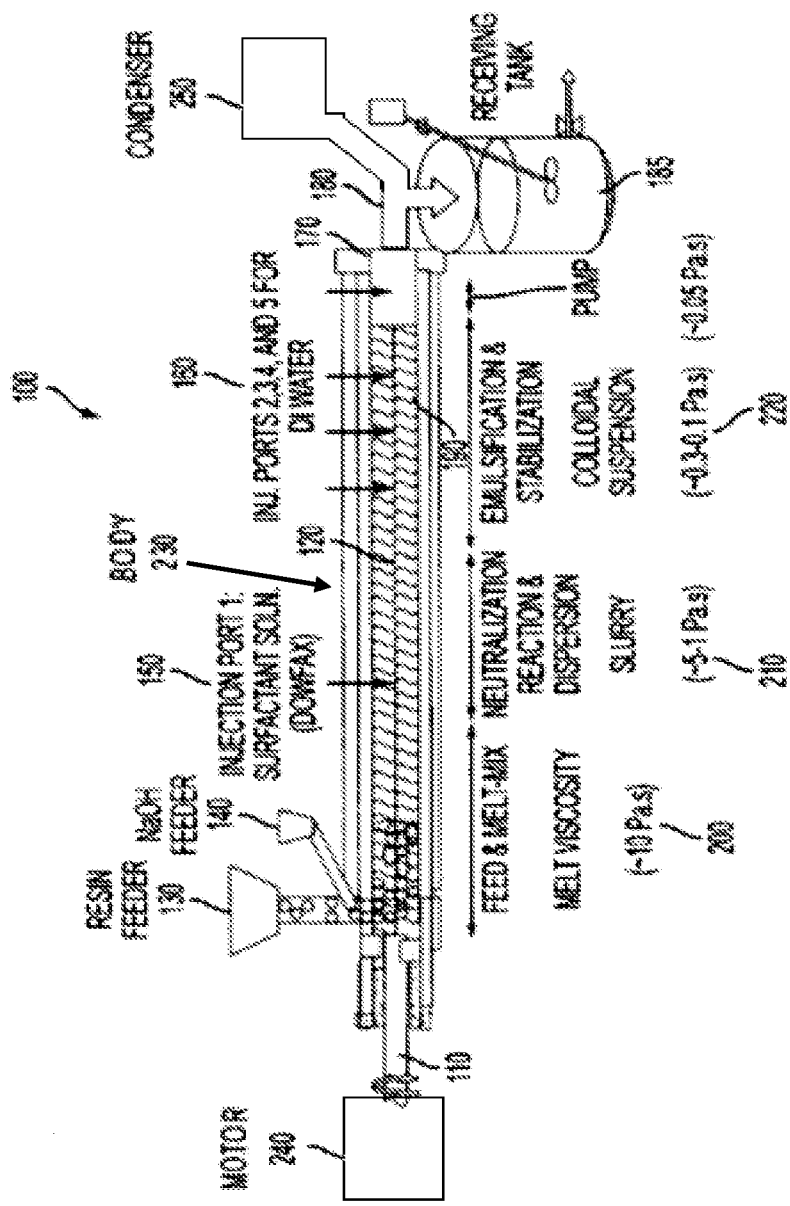
FIG. 10 illustrates a colloidal dispersion and an estimated viscosity profile for latexes produced with a screw extruder of the present disclosure.

In embodiments, the process of the present disclosure may utilize at least one screw extruder to produce a latex emulsion in one continuous process. A schematic diagram of a system utilizing a screw extruder to form the latex emulsion is shown in FIG. 10. Such a system may be used for the production of any polymer latex, including a homogeneous latex or a latex possessing structured polymer particles.

In embodiments, the system of FIG. 10 may be utilized to produce a latex emulsion by way of a continuous bulk polycondensation reaction followed by emulsifying the prepared polyester resin into an aqueous phase without using any solvent.

Turning to FIG. 10, preheated liquid reagents or a mixture of reagents may be fed into the body 230 of the screw extruder 100 through one or multiple supply ports 150, 160 to enable reactive reagents and substrates to be mixed. The reagents introduced through supply ports 150, 160 may include any monomer, acid, diol, surfactant, initiator, seed resin, chain transfer agent, crosslinker, and the like, useful in forming the desired latex. In embodiments, the reaction may take place under an inert gas such as nitrogen, which may be introduced into screw extruder 100 through access port 160 and may exit screw extruder 100 through outlet port 180. A receiving tank 185 may receive the contents of the outlet port 180. A condenser 250 may also be attached to screw extruder 100 to remove water vapor and nitrogen that is flowing counter current to the reactants. The screw extruder 100 may also include a resin feeder 130 and a NaOH feeder 140 for supplying resin and NaOH to the channel 190.

As may be seen in FIG. 10, screw extruder 100 may also include a screw 120, a screw extruder channel 190, an outlet port 180, a pump 170, and optional components (not shown), including heating/cooling systems, thermocouples, and other material supply ports. Screw 120 may be driven by shaft 110, which may be connected to a drive motor 240 in a conventional manner that allows for rotation of screw 120 at speeds of from about 50 rotations per minute ("rpm") to about 1500 rpm, in embodiments from about 250 rpm to about 1000 rpm.

The liquid reagents, optionally preheated to a temperature of from about 80° C. to about 140° C., in embodiments from about 90° C. to about 120° C., may be used to form the latex, and may be fed into the extruder 100 through one or multiple feed streams and then mixed in the extruder 100. The rotation of screw 120 both facilitates mixing of the reactants for the polycondensation stage and the travel of the materials through screw extruder 100. The reaction may take place at a suitable temperature of above about 200° C., in embodiments from about 200° C. to about 360° C., in embodiments from about 210° C. to about 325° C., in other embodiments from about 225° C. to about 275° C. The desired residence time of the reactants may be achieved through the extruder design and operation, including liquid feed rate and screw speed. In embodiments, the reactants may reside in screw extruder 100 during the polycondensation reaction for a period of time from about 1 minute to about 100 minutes, in embodiments from about 5 minutes to about 30 minutes.

The liquid reagents may include preformed polyesters or, in embodiments, reagents utilized to form the polyester itself, for example, any acid, alcohol, diacid, diols, and the like useful in forming the desired polyester. Thus, where the ester is itself formed in screw extruder 100, the polycondensation reaction stage may be divided into two sub-steps: esterification and polycondensation. In such a case, at the esterification step, reagents may be introduced into the screw extruder 100 where they undergo esterification in the portion of the screw extruder 100 closer to supply port 150, with polycondensation occurring closer to the end of the screw extruder 100 closer to outlet port 180.

The rate of polycondensation may be controlled, in part, by controlling the rate of removal of water vapor from the melt, which may result in an increase in the rate of polycondensation. If desired, a slight vacuum may be applied to the system, which, in embodiments, may increase the rate of the polycondensation reaction.

As noted above, in some embodiments nitrogen gas may flow to the reaction system to prevent oxidation and other side reactions.

The end point of the polycondensation reaction may be determined by the desired molecular weight, which correlates to the melt viscosity or acid value of the material. The weight average molecular weight (Mw) and molecular weight distribution (MWD) may be measured by Gel Permeation Chromatography (GPC). The molecular weight may be from about 3,000 g/mole to about 150,000 g/mole, in embodiments from about 8,000 g/mole to about 100,000 g/mole, in embodiments from about 10,000 g/mole to about 90,000 g/mole.

As noted above, these parameters may be consistently obtained by adjusting the rate of polycondensation by controlling the temperature and removing water during the process.

Figure 2:
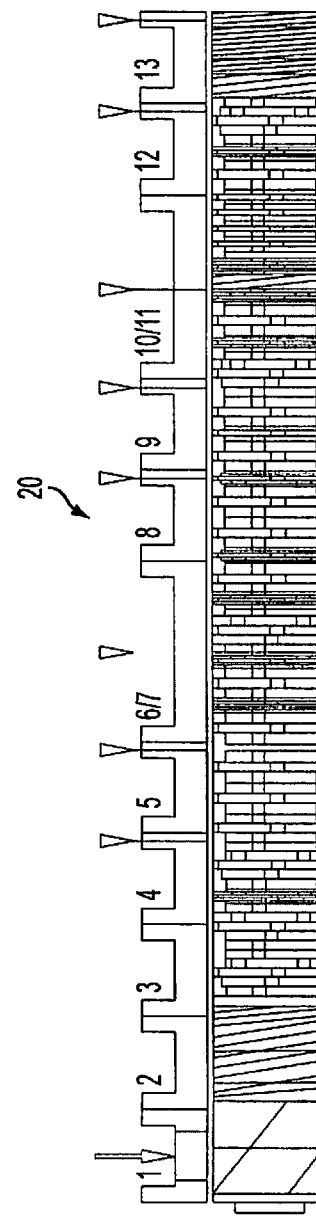
FIG. 2 schematically shows a screw extruder configuration for a 3-lobe machine for emulsification, in accordance with a first embodiment of the present disclosure.
Figure 11:
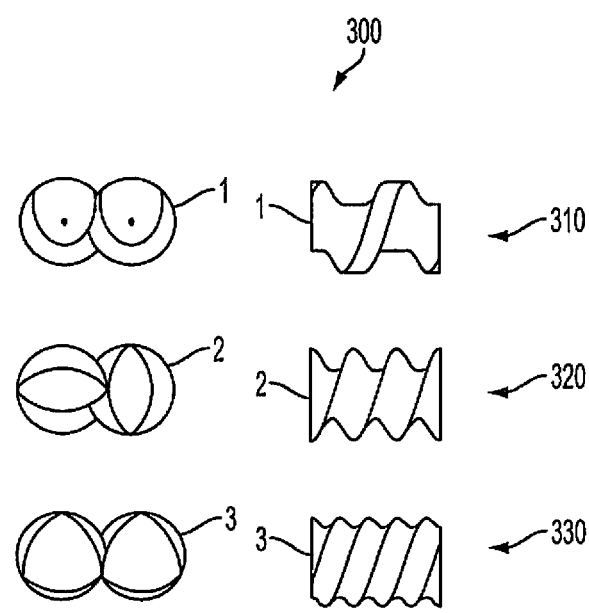
FIG. 11 illustrates the differences between single lobe (1 start of helix), 2-lobe, and 3-lobe screws of the present disclosure.

Moreover, as seen in FIG. 2, a screw extruder configuration 20 used on a 3-lobe machine for emulsification is presented. The terms "2-lobe" and "3-lobe" refer to the number of starts of a helix on the screw. In other words, 2-lobe has 2 starts helix along the screw and 3-lobe has 3 starts helix along the screw. FIG. 11 illustrates the differences between single lobe (1 start of helix), 2-lobe, and 3-lobe screws. The profile 300 depicts a 1-start screw 310, a 2-start screw 320, and a 3-start screw 330. As the number of lobe (starts) increases, the system generates higher shear and shear stress, as well as increases residence time of the material in the system at the same screw speed and process conditions. A 3-lobe machine also generates higher viscous dissipation heat due to high shear stress and shear rate. A 3-lobe machine is more effective for a dissipative melt mix in the extrusion system. However, a 3-lobe machine has less free volume and results in lower throughput, which in turn, lowers productivity compared to a 2-lobe machine. Thus, a 2-lobe machine has higher free volume and increases productivity. A 2-lobe machine may also effectively be used as an equivalent to the 3-lobe machine by changing the process conditions without jeopardizing productivity.

A resin, NaOH, and surfactant mixture may be loaded into feed hoppers 130, 140 of the screw extruder 100 and fed through the screw extruder 100 at a controlled rate. The material intake may be conveyed through conveying screw 120 in the solid conveying zone (section 1 and 2), which are the first sections of the screw extruder 100.

The intake materials may be melted and mixed via dissipative mixing (in section 2 through 4) to ensure that the resin and additives may be intimately mixed before reaching a first water injection port (section 5). This mixture may meet/interact with water and activate the neutralization reaction, where the NaOH neutralizes the resin and wets the surfactant and resin to form a "water in oil" dispersion.

These materials may be intimately mixed in sections 6 to 9 of the extruder 100 where a series of neutral kneading as well as forward and reverse kneading elements may mix the material as well as help convey it down the screw extruder channel 190. The number of kneading elements may vary from about 30% to about 95%, in embodiments from about 50% to about 85%. Kneading elements may be affixed to, or the screw extruder 100 may be formed having kneading elements projecting therefrom. Kneading elements may have any suitable shape, size, and configuration, including right and left hand kneading elements and neutral kneading elements with the helix angle of the kneading elements being from about 45° to about 90°, combinations thereof, and the like. The kneading elements may be forward, neutral, and/or reverse kneading elements, that is, they may push the resin and other materials through the extruder toward the outlet port (forward), they may push the resin and other materials back through the extruder toward the inlet port (reverse), or they may knead the components without actively forwarding or reversing the components through the extruder (neutral).

At section 9, an additional injection of water may be made to begin the transformation of the W/O (water/oil) dispersion to an O/W (oil/water) dispersion. Again, neutral kneading blocks may be used to mix these materials intimately between sections 9 and 10.

Additional water injections may be made in sections 11 and 12 to complete the transition to an O/W dispersion. Forward flight screw elements may be added to sections 11 and 13 to pump the colloidal dispersion out of the screw extruder 100.

Resins

Any monomer suitable for preparing a latex may be used in the present processes. Suitable monomers useful in forming the latex, and thus the resulting latex particles in the latex resin include, but are not limited to, styrenes, acrylates, methacrylates, butadienes, isoprenes, acrylic acids, methacrylic acids, acrylonitriles, mixtures thereof, and the like. Any monomer employed may be selected depending upon the particular latex polymer to be utilized. In embodiments, a seed resin, which includes the latex resin to be produced, may be introduced with additional monomers to form the desired latex resin during polycondensation.

In embodiments, the resin of the latex may include at least one polymer. In embodiments, at least one is from about one to about twenty and, in embodiments, from about three to about ten. In embodiments, the polymer utilized to form the latex may be a polyester resin, including the resins described in U.S. Pat. Nos. 6,593,049 and 6,756,176, the disclosures of each of which are hereby incorporated by reference in their entirety. The toners may also include a mixture of an amorphous polyester resin and a crystalline polyester resin as described in U.S. Pat. No. 6,830,860, the disclosure of which is hereby incorporated by reference in its entirety.

In embodiments, as described above, the resin may be a polyester resin formed by the polycondensation process of reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol may be, for example, selected in an amount of from about 40 to about 60 mole percent of the resin, and the alkali sulfo-aliphatic diol may be selected in an amount of from about 1 to about 10 mole percent of the resin.

Examples of organic diacids or diesters selected for the preparation of the crystalline resins include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, from about 40 to about 60 mole percent of the resin, and the alkali sulfo-aliphatic diacid may be selected in an amount of from about 1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), polypropylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 30 percent by weight of the toner components, in embodiments from about 15 to about 25 percent by weight of the toner components. The crystalline resin may possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 2 to about 4.

Examples of diacid or diesters selected for the preparation of amorphous polyesters include dicarboxylic acids or diesters such as terephthalic acid, phthalic acid, isophthalic acid, furnaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be selected, for example, from about 40 to about 60 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diol selected may vary, and may be, for example, from about 40 to about 60 mole percent of the resin.

Polycondensation catalysts which may be utilized for either the crystalline or amorphous polyesters include tetraalkyl titanates, dialkyltin oxides such as dibutyltin oxide, tetraalkyltins such as dibutyltin dilaurate, dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Examples of amorphous resins which may be utilized include poly(styrene-acrylate) resins, crosslinked, for example, from about 25 percent to about 70 percent, poly(styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly(styrene-methacrylate) resins, alkali sulfonated-poly(styrene-butadiene) resins, and crosslinked alkali sulfonated poly (styrene-butadiene) resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion.

Other examples of suitable latex resins or polymers which may be produced include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), polystyrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly (styrene-butyl acrylate-acrylonitrile), and poly(styrene-butyl acrylate-acrylonitrile-acrylic acid), and combinations thereof. The polymer may be block, random, or alternating copolymers.

In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and pentaerythritol may also be used.

In embodiments, an amorphous polyester resin, for example a polypropoxylated bisphenol A fumarate polyester, may be prepared in the continuous process of the present disclosure and then utilized to form a toner composition. Examples of a suitable poly(propoxylated bisphenol A co-fumarate) include those disclosed in U.S. Pat. No. 6,063,827, the disclosure of which is hereby incorporated by reference in its entirety. Bisphenol A, propylene oxide or propylene carbonate and fumaric acid could be utilized as monomeric components in the process of the present disclosure while a propoxylated bisphenol A fumarate may be utilized as a seed resin to facilitate formation of the latex. A linear propoxylated bisphenol A fumarate resin which may be utilized as a seed resin is available under the trade name SPARII from Resana S/A Industrias Quimicas, Sao Paulo Brazil. Other propoxylated bisphenol A fumarate resins that are commercially available include GTUF and FPESL-2 from Kao Corporation, Japan, and EM181635 from Reichhold, Research Triangle Park, North Carolina and the like.

Moreover, where the polycondensation step described above is not required, any pre-made polyester may be subjected to the remaining steps, i.e., neutralization and emulsification, to produce a resin using the continuous solvent-free emulsification process of the present disclosure. Such polyesters include, for example, any of the polyesters or other resins described above, including amorphous and/or semi-crystalline polyesters, such as poly(propoxylated bisphenol A co-fumarates) as described above and crystalline polyesters such as A3C crystalline polyester (a proprietary blend of 1,4-butanediol, fumaric acid, and adipic acid available from Kao Corporation (Japan)).

Examples of initiators which may be added in preparing the latex include water soluble initiators, such as ammonium and potassium persulfates, and organic soluble initiators including peroxides and hydroperoxides including Vazo peroxides, such as VAZO 64™, 2-methyl 2-2'-azobis propanenitrile, VAZO 88™, and 2-2'-azobis isobutyramide dehydrate and mixtures thereof. In embodiments, chain transfer agents may be utilized including dodecane thiol, octane thiol, carbon tetrabromide, mixtures thereof, and the like. The amount of initiator may be from about 0.1 to about 8 percent by weight of the final emulsion composition, in embodiments from about 2 to about 6 percent by weight of the final emulsion composition.

After polycondensation, the resulting polyester may have acid groups at the terminal of the resin. Acid groups which may be present include carboxylic acids, carboxylic anhydrides, carboxylic acid salts, combinations thereof, and the like. The number of carboxylic acid groups may be controlled by adjusting the starting materials and reaction conditions to obtain a resin that possesses excellent emulsion characteristics and a resulting toner that is environmentally durable.

After the above polycondensation process is complete, the materials may be cooled to a temperature of from about 90° C. to about 105° C., in embodiments from about 94° C. to about 100° C., in embodiments about 96° C., and transferred to the next stage.

Neutralization and Emulsification

Once polycondensation is complete, the process materials continue through a screw extruder 100 for neutralization and emulsification. While FIG. 10 depicts the polyester from the polycondensation reaction being transferred to a screw extruder 100 for neutralization and emulsification, in embodiments a pre-made polyester may be obtained and introduced into the screw extruder 100 for neutralization and emulsification. Thus, where a pre-made polyester may be utilized, the above polycondensation portion of the process of the present disclosure may be omitted.

Any pre-made resin such as a polyester in an aqueous phase may be subjected to the remaining processes of the present disclosure. In embodiments, the remaining processes of the present disclosure may include a phase inversion process which does not require the use of solvent. Examples of such processes include those disclosed in U.S. Patent Application Publication No. 2007/0141494, the disclosure of which is hereby incorporated by reference in its entirety.

In embodiments, the polyester produced by the polycondensation process described above, or a pre-made polyester as described above, may be subjected to neutralization and emulsification as follows. As depicted in FIG. 10, a suitable system for neutralization and emulsification may include screw extruder 100 possessing one or multiple supply ports 150, 160 to receive the polycondensation product or, as noted above, any pre-made polyester that has been processed, in embodiments by melt mixing, neutralization, emulsification and stabilization, combinations thereof, and the like, to obtain small enough particles that may be processed in accordance with the present disclosure to form toner particles. The resin and NaOH may go through a feed and melt-mix process 200, then through a neutralization reaction and dispersion process 210, and then through an emulsification and stabilization process 220.

The screw extruder 100 of the present disclosure may be used in any type of specialty chemical industries, paint industries, and food industries that require a screw extruder 100 for continuous and solvent-less emulsification processes, which controls mixing dynamics, effectively accelerates reactions and increases effects of emulsification in the screw extruder 100. The screw extruder configuration of the present disclosure may enable continuous processes with controlled feed rate, temperature, and mixing dynamics. The screw extruder 100 may be used for emulsification of crystalline resins and/or amorphous resins. The screw extruder 100 may mechanically cooperate with a 2-lobe machine or a 3-lobe machine.

Figure 1:
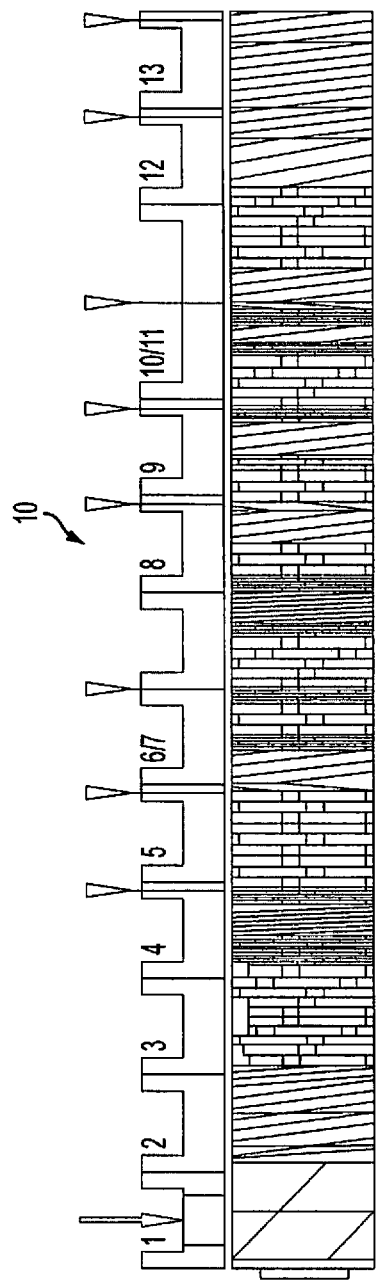
FIG. 1 schematically shows a screw extruder configuration for a 3-lobe machine for emulsification.

FIGS. 1 and 4 illustrate previous screw designs 10, 40 that did not lead to successful emulsification of an amorphous resin, although they did lead to successful emulsification of crystalline resins. To overcome such challenges, screw designs 20, 50 (depicted in FIGS. 2 and 5) were developed to allow for the effective melt-mixing of the neutralization agent and surfactant with the resin and subsequent contact with water, and kneading elements during dynamic mixing to produce a high quality amorphous latex.

FIGS. 2 and 5 illustrate screw designs of the present disclosure that reinforce mixing dynamics and lengthen the residence time for effective colloidal dispersion inside the screw extruder 100. The screw extruder 100 may be designed to melt and mix materials simultaneously through dissipative mixing so that NaOH and resin mix together, effectively in short residence time, before they meet with a surfactant solution injected through injection port 150, as shown in FIGS. 2 and 10.

Conveying screw elements used in the screw designs of screws 10, 40 of FIGS. 1 and 4 were replaced with neutral kneading elements 22, 52 (see FIGS. 2 and 5) to promote intense dispersive mixing and lengthen the residence time in the reactor. This will improve the reaction between NaOH and the resin mixture when they meet with water in the surfactant solution, and promote the formation of a water-in-oil dispersion (until the reactants meet with water at the down stream of the channel 190). At the down stream of the channel 190, water injections (injection ports 160) may also be changed to maximize dispersive mixing for effective emulsification (oil-in water) to produce colloidal suspension. It is noted that FIGS. 1 and 2 refer to a 3-lobe machine, whereas FIGS. 4 and 5 refer to a 2-lobe machine.

The screw configurations 20, 50 of the present disclosure (see FIGS. 2, 5, and 10) offer at least the following benefits over the screw configurations 10, 40 of FIGS. 1 and 4: (1) about 59% increase in process yield from 36% to 95% (based on coarse content reduction) for the crystalline resin; (2) about 13% increase in process yield from 86% to almost 100% (based on coarse content reduction) for a low Mw amorphous resin; and (3) about 67% increase in residence time that allows the production of latexes with higher solids contents.

In one aspect of the present disclosure, the percentage of kneading block elements on the screw extruder 100 may be increased from about 46% to about 85%, in embodiments from about 50% to about 77%. This may increase the residence time of the reactants in the screw extruder 100, which in turn produces better emulsions.

Neutralizing Agent

As noted above, in embodiments carboxylic acid groups may be present on the resin produced in the polycondensation stage or any pre-made polymer, such as amorphous and crystalline polyester resins. Such carboxylic acid groups may be partially neutralized by the introduction of a neutralizing agent, in embodiments a base solution, during the neutralization stage. Suitable bases which may be utilized for this neutralization include, but are not limited to, ammonium hydroxide, potassium hydroxide, sodium hydroxide, sodium carbonate, sodium bicarbonate, lithium hydroxide, potassium carbonate, triethyl amine, triethanolamine, pyridine and its derivatives, diphenylamine and its derivatives, poly(ethylene amine) and its derivatives, combinations thereof, and the like.

After neutralization, the hydrophilicity, and thus the emulsifiability of the resin, may be improved when compared with a resin that did not undergo such neutralization process. The degree of neutralization may be controlled, in embodiments, by the concentration of the base solution added and the feeding rate of the base solution. In embodiments, a base solution may be at a concentration of from about 1% by weight to about 20% by weight, in embodiments from about 2% by weight to about 10% by weight, with the rate of addition of the base solution into the extruder 100 being from about 10 grams per minute to about 50 grams per minute, in embodiments from about 11.25 grams per minute to about 22.5 grams per minute. The resulting partially neutralized melt resin may be at a pH of from about 8 to about 13, in embodiments from about 11 to about 12.

The resulting partially neutralized melt resin may then proceed through screw extruder 100 into the emulsification zone, where a preheated emulsifying agent, in embodiments an aqueous stabilizer, may be added at a controlled rate. As noted above, the process of the present disclosure does not require the use of solvents, as the neutralized resin has excellent emulsifiability in the stabilizers described herein. In embodiments, the preheated aqueous stabilizer may be added under pressure with nitrogen gas to reduce the cycle time of the process and minimize any polyester crystallization. The temperature under which emulsification proceeds should be at least about 20° C. higher than the melting point of the polyester, to permit the proper flow of the resin through the extruder 100 and permit sufficient emulsification of the particles. Suitable temperatures for emulsification may depend upon the polyester resin utilized, but may be from about 80° C. to about 180° C., in embodiments from about 90° C. to about 110° C.

Emulsifying Agents

Suitable stabilizers which may be added at this emulsification stage as emulsifying agents include any surfactant suitable for use in forming a latex resin. Surfactants which may be utilized during the emulsification stage in preparing latexes with the processes of the present disclosure include anionic, cationic, and/or nonionic surfactants. Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxylethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, mixtures thereof, and the like. In embodiments commercially available surfactants from Rhone-Poulenc such as IGEPAL CA210™, IGEPAL CA520™, IGEPAL CA-720™, IGEPAL CO-890™, IGEPAL CO-720™, IGEPAL CO-290™, IGEPAL CA210™, ANTAROX 890™ and ANTAROX 897™ may be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

The desired amount of time for emulsification may be obtained by modifying such aspects of the system of the present disclosure including the extruder design, the speed at which the screw 120 spins as described above, the temperature of the barrels as described above, and the feed rate of the resin into screw extruder 100. The feed rate of resin into screw extruder 100 may be from about 1 pound per hour (lb/hr) to about 70 lb/hr, in embodiments from about 5 lb/hr to about 10 lb/hr. In embodiments, the resin may reside in screw extruder 100 during the neutralization and during the emulsification stage for a period of time from about 30 seconds to about 180 seconds, in embodiments from about 40 seconds to about 150 seconds.

The size of the final polyester particles thus produced and their size distribution may be controlled by adjusting the degree of neutralization of the carboxyl groups, the amount of stabilizer added, and residence time of the resin in the neutralization and emulsification stage. In practice, resins produced in accordance with the present disclosure may have a particle size of from about 30 nm to about 500 nm, in embodiments from about 40 nm to about 300 nm.

For continuous polyester emulsification, the residence time during the various stages of the above process should be long enough to ensure the polymer is emulsified and the suspension is stable.

The resulting emulsion may exit screw extruder 100 by way of polyester exit port 180. The emulsion may be subjected to an optional homogenization step in another screw extruder or any suitable mixing or blending device within the purview of those skilled in the art (not shown), for homogenization at a temperature of from about −10° C. to about 100° C., in embodiments from about 80° C. to about 95° C. An additional aqueous stabilizer solution may be added to the emulsion during this optional homogenization step to stabilize the polyester particles. The amount of stabilizer may be from about 0.1 to about 10 percent by weight of the final emulsion composition, in embodiments from about 2 to about 8 percent by weight of the final emulsion composition.

While the above description describes a screw design having one screw extruder as depicted in FIG. 10, multiple screw extruders with multiple zones, including an esterification zone, polycondensation zone, neutralization zone and emulsion zone may be utilized. Or, multiple screw extruders may be configured so that polycondensation and optional esterification occurs in one extruder, neutralization occurs in a separate extruder, and emulsification occurs in a separate extruder.

After addition of a neutralizer and surfactants during emulsification as described above, the neutralization and emulsification portions of the process of the present disclosure may be complete and a latex resin obtained as described above.

Once obtained, the latex of the present disclosure may be combined with a colorant and other optional ingredients, to produce a toner by processes within the purview of those skilled in the art. For example, in embodiments, the latex resin may be combined with a colorant and optional wax and other ingredients and subjected to aggregation/coalescence/washing to produce a toner.

Colorants

Colorants which may be utilized in a toner of the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP604™, NP608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI-60710, CI Dispersed Red 15, diazo dye identified in the Color Index as CI-26050, CI Solvent Red 19, CI 12466, also known as Pigment Red 269, CI 12516, also known as Pigment Red 185, copper tetra(octadecyl sulfonamido) phthalocyanine, x-copper phthalocyanine pigment listed in the Color Index as CI-74160, CI Pigment Blue, Anthrathrene Blue identified in the Color Index as CI-69810, Special Blue X-2137, diarylide yellow 3,3-dichlorobenzidene acetoacetanilides, a monoazo pigment identified in the Color Index as CI 12700, CI Solvent Yellow 16, CI Pigment Yellow 74, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 18 weight percent of the toner.

Waxes

Wax dispersions may also be added to the latex and colorant to obtain toners of the present disclosure. Suitable waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or nonionic surfactant may be present in an amount of from about 0.5 to about 10 percent by weight, and in embodiments of from about 1 to about 5 percent by weight of the wax.

The wax dispersion according to embodiments of the present disclosure includes a wax for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, Joncryl 74, 89, 130, 537, and 538, all available from Johnson Diversey, Inc, or chlorinated polypropylenes and polyethylenes commercially available from Allied Chemical and Petrolite Corporation and Johnson Diversey, Inc.

The wax may be present in an amount of from about 1 to about 30 percent by weight, and in embodiments from about 2 to about 20 percent by weight of the toner.

Toner Processing

The mixture of latex, colorant and optional wax is subsequently coalesced. Coalescing may include stirring and heating at a temperature of from about 90° C. to about 99° C., for a period of from about 0.5 to about 6 hours, and in embodiments from about 2 to about 5 hours. Coalescing may be accelerated by additional stirring.

The pH of the mixture is then lowered to from about 3.5 to about 6 and in embodiments, to from about 3.7 to about 5.5 with, for example, an acid to coalesce the toner aggregates. Suitable acids include, for example, nitric acid, sulfuric acid, hydrochloric acid, citric acid or acetic acid. The amount of acid added may be from about 4 to about 30 percent by weight of the mixture, and in embodiments from about 5 to about 15 percent by weight of the mixture.

The mixture is cooled, washed and dried. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling media such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture is not feasible nor practical, neither by the introduction of a cooling medium into the toner mixture, nor by the use of jacketed reactor cooling.

The coalesced toner may then be washed. The washing may be carried out at a pH of from about 7 to about 12, and in embodiments at a pH of from about 9 to about 11. The washing is at a temperature of from about 45° C. to about 70° C., and in embodiments from about 50° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

The washed slurry may then be dried. Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Aggregating Agents

In embodiments, aggregating agents may be included in forming toner particles of the present disclosure. Any aggregating agent capable of causing complexation might be used in forming toner of the present disclosure. Both alkali earth metal or transition metal salts may be utilized as aggregating agents. In embodiments, alkali (II) salts may be selected to aggregate sodio sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally mixtures thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, mixtures thereof, and the like.

Coagulants

In order to aid in the processing of the toner composition, an ionic coagulant having an opposite polarity to any ionic surfactant in the latex (i.e., a counterionic coagulant) may optionally be used in the toner composition. The quantity of coagulant is present to, for example, prevent/minimize the appearance of fines in the final slurry. Fines refers, in embodiments, for example, to small sized particles of less than about 6 microns in average volume diameter, in embodiments from about 2 microns to about 5 microns in average volume diameter, which fines may adversely affect toner yield. Counterionic coagulants may be organic or inorganic entities. Exemplary coagulants that may be included in the toner include polymetal halides, polymetal sulfosilicates, monovalent, divalent or multivalent salts optionally in combination with cationic surfactants, mixtures thereof, and the like. Inorganic cationic coagulants include, for example, polyaluminum chloride (PAC), polyaluminum sulfo silicate (PASS), aluminum sulfate, zinc sulfate, or magnesium sulfate. For example, in embodiments the ionic surfactant of the resin latex dispersion may be an anionic surfactant, and the counterionic coagulant may be a polymetal halide or a polymetal sulfo silicate. When present, the coagulant is used in an amount from about 0.02 to about 2 percent by weight of the total toner composition, in embodiments from about 0.1 to about 1.5 percent by weight of the total toner composition.

Additives

The toner may also include any known charge additives in amounts of from about 0.1 to about 10 weight percent, and in embodiments of from about 0.5 to about 7 weight percent of the toner. Examples of such charge additives include alkyl pyridinium halides, bisulfates, the charge control additives of U.S. Pat. Nos. 3,944,493, 4,007,293, 4,079,014, 4,394,430 and 4,560,635, the disclosures of each of which are hereby incorporated by reference in their entirety, negative charge enhancing additives like aluminum complexes, and the like.

Surface additives may be added to the toner after washing or drying. Examples of such surface additives include, for example, metal salts, metal salts of fatty acids, colloidal silicas, metal oxides, strontium titanates, mixtures thereof, and the like. Surface additives may be present in an amount of from about 0.1 to about 10 weight percent, and in embodiments of from about 0.5 to about 7 weight percent of the toner. Example of such additives include those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, may also be present in an amount of from about 0.05 to about 5 percent, and in embodiments of from about 0.1 to about 2 percent of the toner, which additives may be added during the aggregation or blended into the formed toner product.

Uses

Toner particles produced utilizing a latex of the present disclosure may have a size of about 1 micron to about 20 microns, in embodiments about 2 microns to about 15 microns, in embodiments about 3 microns to about 7 microns.

Toner in accordance with the present disclosure may be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure may be selected for electrophotographic imaging and printing processes such as digital imaging systems and processes.

Developer compositions may be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the disclosures of each of which are hereby incorporated by reference in their entirety. The carriers may be present from about 2 percent by weight of the toner to about 8 percent by weight of the toner, in embodiments from about 4 percent by weight to about 6 percent by weight of the toner. The carrier particles may also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Imaging methods are also envisioned with the toners disclosed herein. Such methods include, for example, some of the above patents mentioned above and U.S. Pat. Nos. 4,265,990, 4,858,884, 4,584,253 and 4,563,408, the disclosures of each of which are hereby incorporated by reference in their entirety. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner may normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer.

Advantages of the continuous process of the present disclosure over batch processes include: (1) it does not require large quantities of materials that are necessary in batch processes; (2) it provides much better control of the process (accurate feed control of each component material, better control process temperature, shear, residence time, and the like) and excellent consistency of product quality; (3) it is more energy efficient and environmentally friendly because it is solvent free; (4) it may dramatically reduce production time; (5) it may improve process safety by eliminating the need to handle solvents and materials (unlike in a batch process); (6) it reduces inventory by the fact that it is a just in time process; (7) it allows in situ solvent-free polyester emulsification; (8) it allows for the control of dispersion particle size and size distribution; and (9) it increases productivity and reduces unit manufacturing costs (UMC).

Moreover, the use of neutralization agents as described above, which neutralize the carboxylic groups on the polyester resins, may be utilized in combination with an anionic surfactant as described above to enhance emulsification and the use of a non-ionic surfactant may result in an emulsion having excellent stabilization without the need for solvents.

The following examples illustrate embodiments of the present disclosure. The examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Comparative Example 1

A crystalline latex production with a conventional screw design similar to the one depicted in FIG. 1 (3-lobe machine) is presented.

The extruder was equipped with a feed hopper and screw design as shown in FIG. 1 (design 1). Liquid injection ports were heated to about 95° C. and fed a mixture of sodium dodecylbenzene sulfonate, NaOH and a low molecular weight (e.g., 22000) crystalline resin, as shown in process flow 30 of FIG. 3, to emulsify the resin. The latex produced had very high coarse content (63.7%) and was therefore unusable for emulsion aggregation toner applications. Tables 1 and 2 below summarize the experimental conditions and resulting latex properties, respectively.

Example 1

Figure 3:
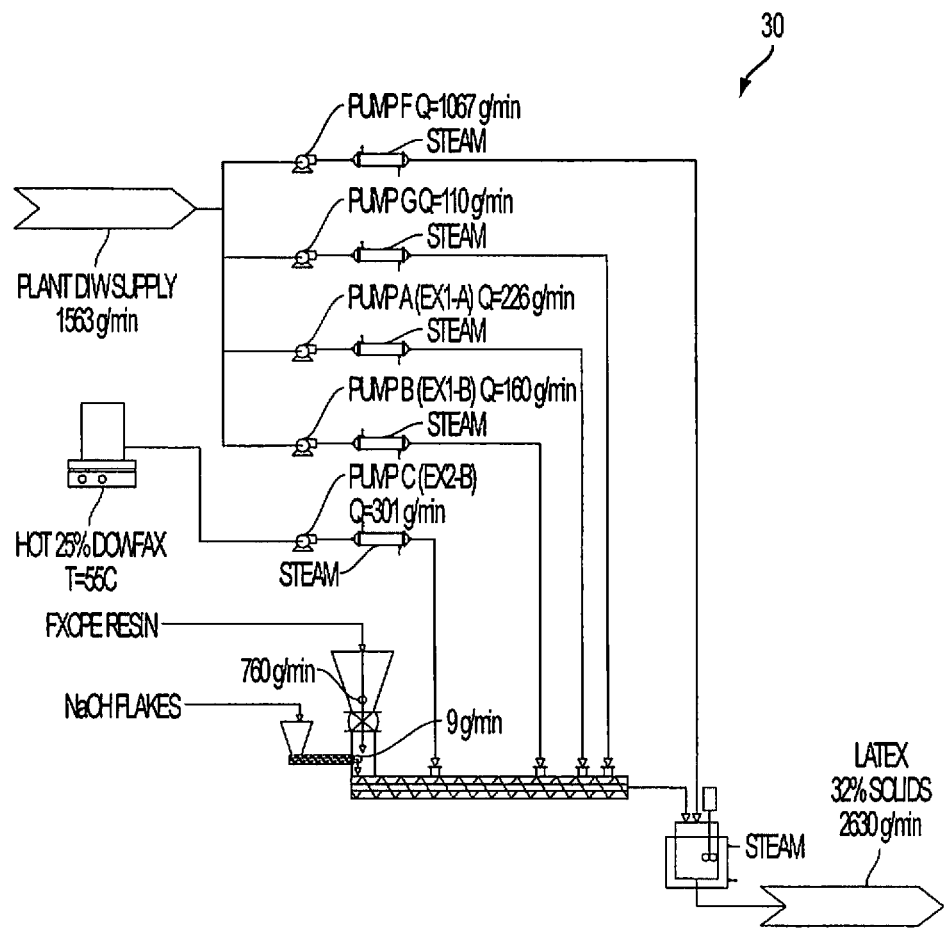
FIG. 3 is a flowchart depicting a process flow for crystalline polyester emulsification, in accordance with the present disclosure.

The same extruder from Comparative Example 1, but having a screw design of the present disclosure as shown in FIG. 2 (design 2) was used to form the same resin of Comparative Example 1 as shown in process flow 30 of FIG. 3 to emulsify the resin. The latex produced had very low coarse content (5%) making it usable for emulsion aggregation toner applications. Tables 1 and 2 below summarize the experimental conditions and resulting latex properties, respectively. It is clear from this comparison that the screw design (design 2) of the present disclosure enabled the process improvement.

TABLE 1

Effect of Screw Design on Crystalline Resin Emulsification.

| Example | Screw Design | Temperature Profile (° F.) | Neutralization Ratio | Surfactant (pph) | Port 1 | D50 (nm) |
|---|---|---|---|---|---|---|
| Comparative Example 1 | Original | 140/203 . . . /203/212 | 1.50 | 7.0 | Hot DIW @ 150 ml/min | 163 |
| Example 1 | New | 140/203 . . . /203/212 | 1.50 | 7.0 | Hot DIW @ 150 ml/min | 103 |

TABLE 2

| | Latex Properties | | | |
|---|---|---|---|---|
| Example | Shape | Width | Solid Content (%) | Coarse Particle >20 um (%) |
| Comparative Example 1 | 100% | 0.13 | 20.9 | 63.7 |
| Example 1 | 100% | 0.08 | 36.8 | 5.0 |

Comparative Example 2

An amorphous latex production with the conventional screw design (design 1) for a 3-lobe machine is presented.

Figure 6:
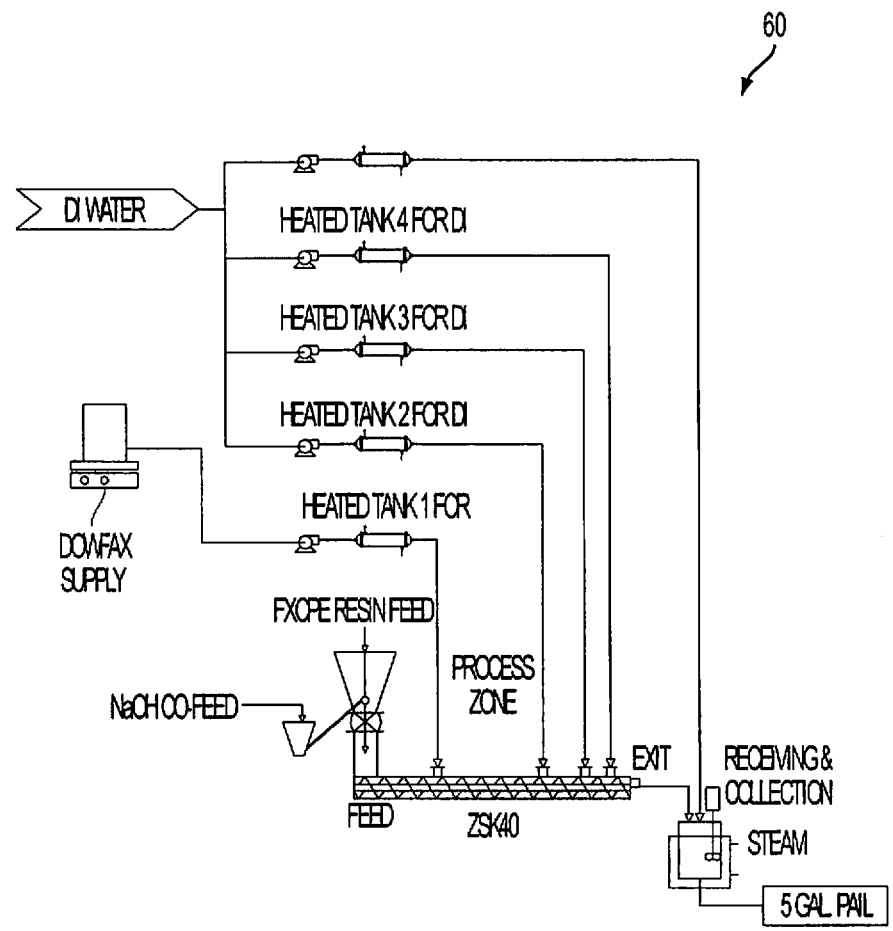
FIG. 6 is a flowchart depicting a process flow for amorphous polyester emulsification, in accordance with the present disclosure.

The extruder of Comparative Example 1 was equipped with a feed hopper, screw design as shown in FIG. 1 (design 1) and liquid injection ports, and was heated to about 95° C. and fed a mixture of sodium dodecylbenzene sulfonate, NaOH and a low molecular weight (e.g., 19200) amorphous resin, as shown in process flow 60 of FIG. 6, to emulsify the resin. The latex produced had a high coarse content (13.7%) and low yield, making the process un-attractive commercially. Tables 3 and 4 below summarize the experimental conditions and resulting latex properties, respectively.

Example 2

The same extruder of Comparative Example 1 was used, except the extruder possessed a screw design of the present disclosure as shown in FIG. 2 (design 2). The screw extruder configuration is depicted as 50 of FIG. 5. The same amorphous resin was used and emulsified. The screw design of the present disclosure, because of the additional void volume it permitted, allowed additional water injection to the extruder. The resulting latex had very low coarse content (0.8%) and therefore a very high process yield, making it a commercially attractive process. Tables 3 and 4 below summarize the experimental conditions and resulting latex properties, respectively. It is clear from that the new screw design enabled the process improvement.

Example 3

Example 1 was repeated with some variations in amounts of materials, as shown in process flow 60 of FIG. 6, and Tables 3 and 4 below. Again, the screw design of the present disclosure, because of the additional void volume it permitted, allowed additional water injection to the extruder. The latex produced had very low coarse content (0.1%) and therefore a very high process yield, making it a commercially attractive process. It is clear that the new screw design enabled the process improvement.

TABLE 3

Effect of Screw Design on Amorphous Resin Emulsification.

| | | Experimental Conditions | | | | | |
|---|---|---|---|---|---|---|---|
| Example | Screw Design | Temperature Profile (° F.) | Neutralization Ratio | Surfactant (pph) | Port 1 | Port 2 | Port 3 |
| Comparative Example 2 | Original | 140/203 .../203/212 | 1.2 pph | 10 | Hot DIW @ 120 ml/min | NA | NA |
| Example 2 | New | 140/203 .../203/212 | 0.6 pph | 5 | Hot DIW @ 120 ml/min | DIW @ 180 ml/min | DIW @ 300 ml/min |
| Example 3 | New | 140/203 .../203/212 | 1.2 pph | 10 | Hot DIW @ 120 ml/min | DIW @ 180 ml/min | DIW @ 300 ml/min |

TABLE 4

Latex Properties

| Example | D50 (nm) | Shape | Width | Solid Content (%) | Coarse Particle >20 um (%) |
|---|---|---|---|---|---|
| Comparative Example 2 | 47.9 | 100% | 0.03 | 7.1 | 13.67 |
| Example 2 | 113 | 100% | 0.10 | 24.4 | 0.8 |
| Example 3 | 49.9 | 100% | 0.04 | 29.1 | 0.1 |

FIG. 6 depicts a schematic diagram 60 for the amorphous latex emulsification process on the 2-lobe machine. In this process, additional water was injected on-line through the die instead of manually adding the water into the receiving tank to obtain the target solids content.

Table 5 below shows latex quality produced by the same screw configurations on two different scales, 25 mm diameter and 40 mm diameter, at same formulation of NaOH and DOWFAX surfactant and at same process conditions, about 95° C. and about 350 rpm.

Figure 7:
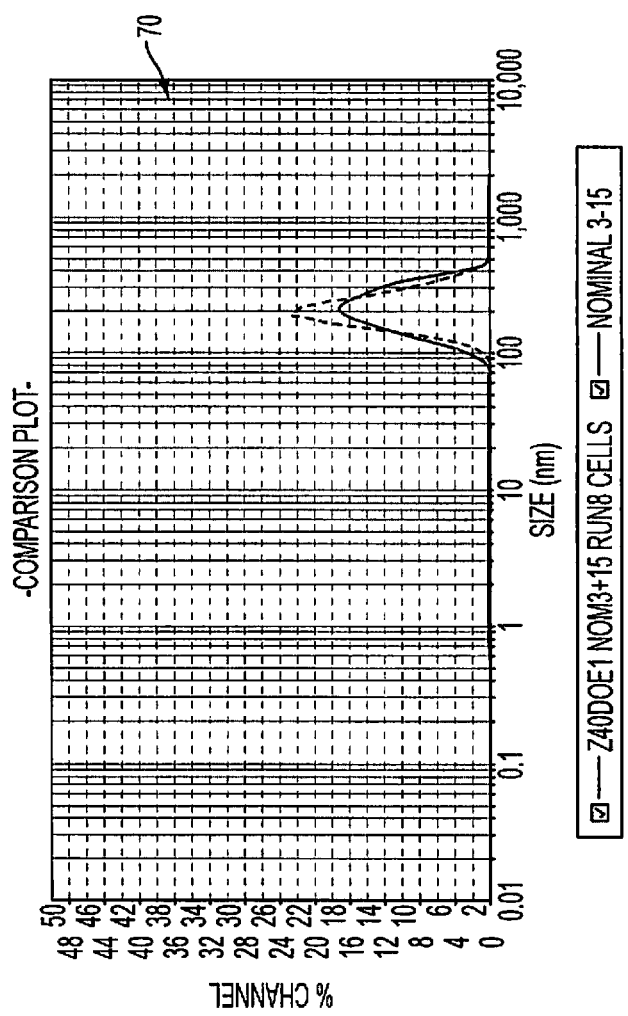
FIG. 7 depicts a comparison of latex particle sizes obtained with the screw extruder configurations of FIGS. 4 and 5, in accordance with the present disclosure.
Figure 8:
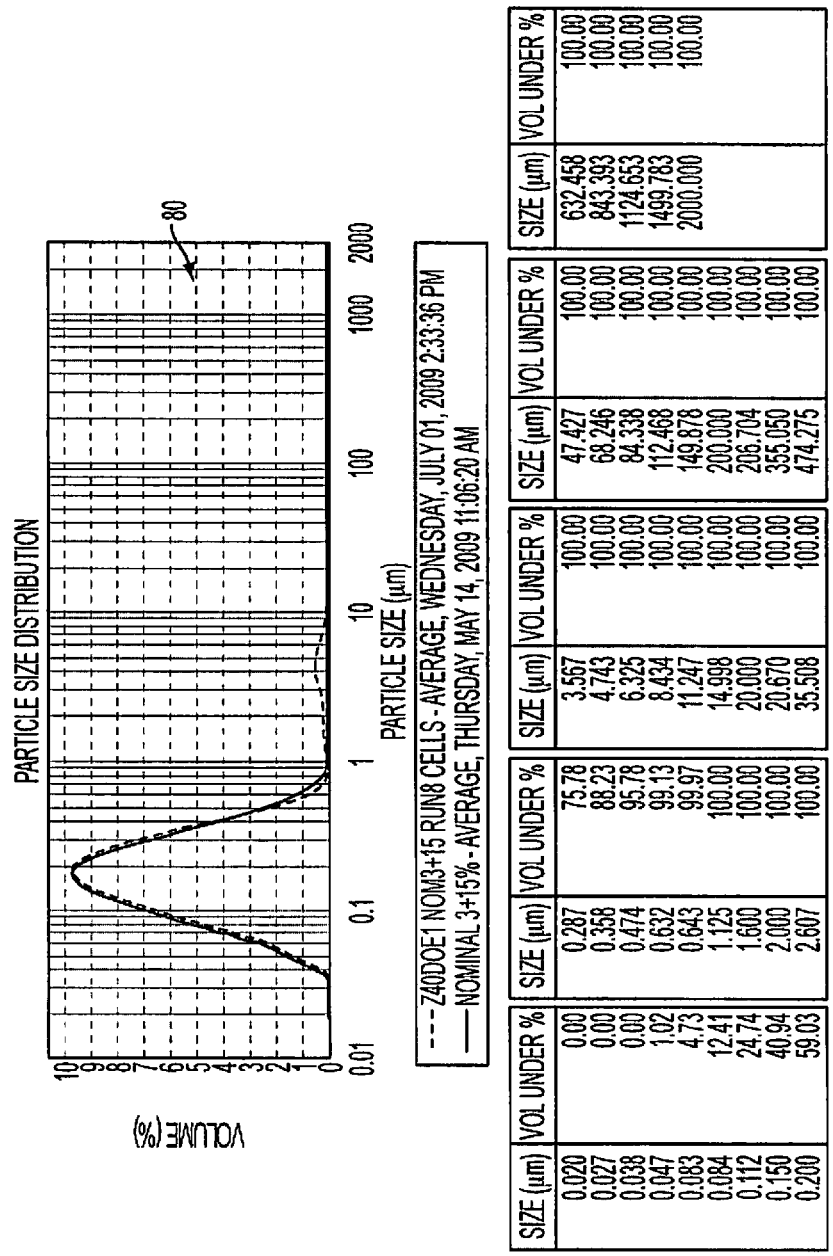
FIG. 8 depicts a comparison of latex coarse particle content obtained with screw extruder configurations of FIGS. 4 and 5, in accordance with the present disclosure.

FIG. 7 depicts a comparison 70 of latex particle sizes obtained with the screw extruder configurations of FIGS. 4 and 5, in accordance with the present disclosure, whereas FIG. 8 depicts a comparison 80 of latex coarse particle content of the screw extruder configurations of FIGS. 4 and 5, in accordance with the present disclosure.

TABLE 5

Latex quality from same screw design on different extruder scale

| | | Formulation | | Particle size | | coarse content | |
|---|---|---|---|---|---|---|---|
| Extruder scale | Resin FR (lb/hr) | NaOH pph | DOWFAX pph | D50 (nm) | size dist. width | % vol >1□ (%) | % vol >20□ (%) |
| 25 mm diameter | 16 | 0.92 | 4.06 | 211.8 | 0.16 | 0 | 0 |
| 40 mm diameter | 66 | 0.92 | 4.06 | 205 | 0.12 | 2.97 | 0 |

Example 4

An amorphous resin emulsification process was developed using the screw design shown on the screw extruder configuration 40 of FIG. 4 and on the screw configuration 50 of FIG. 5 (both 2 lobe machines).

The same principle of screw design 2 was applied in a 2-lobe machine to accelerate resin melt mix through dissipation energy and to reinforce dynamics of mixing for effective reaction and emulsification inside the extruder 100. Data shown below demonstrates screw design importance for production of quality latex with target size and no coarse contents in the latex. A total of 5 injection ports were used for the process. One for DOWFAX surfactant solution, 3 ports along the barrel, and one injection at the die (not shown). Solid content targeted 35% and formulations were changed to determine processability.

A low Mw amorphous polyester was used to make a latex. Amorphous latex comparisons produced from screw design (FIG. 4) (2-lobe machine) and screw design (FIG. 5, 2-lobe machine) from scale-up process is presented.

Example 5

Figure 9:
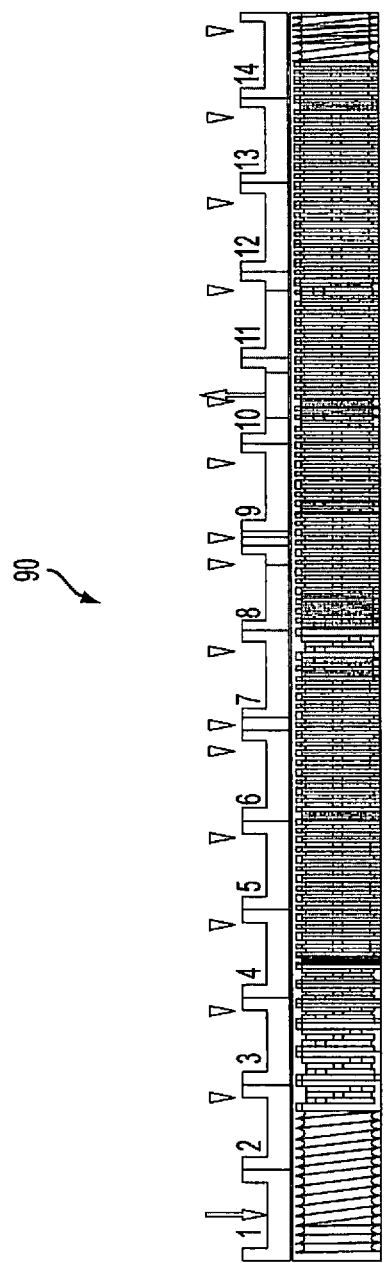
FIG. 9 schematically shows a screw extruder configuration for a 2-lobe machine for emulsification, in accordance with a third embodiment of the present disclosure.

The process described above in Example 4 was scaled up to manufacturing scale using screw design 90 are shown in FIG. 9. The length/diameter (L/D) ratio of the extruder with the 40 mm diameter screw was much shorter than the L/D ratio of the extruder with the 25 mm diameter screw, as shown in Table 6, below, and it resulted in processing emulsification at higher temperature (203° F. vs. 230° F.) and higher screw speed (250 rpm vs. 350 rpm) than on the extruder with the 25 mm diameter screw to compensate for heat transfer loss and emulsifying at shorter residence time.

The L/D ratio of a manufacturing extruder (48.27) was much shorter than that of the extruder with the 25 mm diameter screw (53.52). Therefore, two more barrels were used to make the L/D closer to the conventional extruder with consistent screw design, as depicted in Table 6, below. Specific heat transfer surface area dramatically decreased as scale increased and limited the heat transfer, which was crucial for melting the resin and triggering the neutralization reaction. It was equally important to maintain mixing dynamics for the neutralization reaction as well as emulsification similar to those in the extruder with the 25 mm diameter screw.

Table 6 below shows L/D ratio of different scale of the extruders. ZSK25 is the extruder with the 25 mm diameter screw, ZSK40 is a Pilot scale extruder with the 40 mm diameter screw, and ZSK92 is manufacturing scale extruder with the 92 mm diameter screw.

TABLE 6

Length over Diameter Ratio for Extruders

| ZSK-92 | ZSK-40 | ZSK-25 |
|---|---|---|
| 55.76 | 50.5 | 53.52 |

Manufacturing feasibility is now described. Latex was collected at a 2000 lb/hr latex collection rate at 35% solid content with pH between 7-8. Formulations included 1.2 pph NaOH and 5.6 pph DOWFAX, 1.2 pph 1.0 NaOH and 4.8 pph DOWFAX, and at 1.1 pph NaOH and 5.2 pph 17% DOWFAX solution. Deionized water (DIW) injection points were at barrel 10, 11, 12, and 14, 250 rpm screw speed, and 212° F. barrel temperature profile. Particle size and coarse contents are shown in Table 7, below.

TABLE 7

Particle size and coarse contents of latex from the manufacturing scale extruder.

| Base (pph) | Surfactant (pph) | D50 (nm) | D95 (nm) | coarse >1 um | coarse >20 um |
|---|---|---|---|---|---|
| 1 | 4.8 | 243 | 411 | 18.08 | 7.3 |
| 1 | 5.6 | 338 | 520 | 7.44 | 1.67 |
| 1.2 | 4.8 | 229 | 362 | 6.28 | 1.63 |
| 1.2 | 5.6 | 208 | 373 | 5.45 | 1.04 |
| 1.1 | 5.2 | 239 | 406 | 5.92 | 1.57 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A screw extruder comprising:
   a feed hopper for receiving materials, wherein the feed hopper is in communication with
   a body member having at least one supply port and at least one outlet port;
   a series of one or more conveying screw elements positioned within the body member;
   a series of one or more forward, neutral, and reverse kneading elements interspersed between the conveying screw elements; and
   a drive shaft for rotating the conveying screw elements and the series of one or more kneading elements along a channel defining a longitudinal axis of the extruder;
   wherein the screw extruder is configured to mix the materials received via the feed hopper with the series of one or more kneading elements, wherein there are one or more conveying screw elements between the one or more kneading elements and two or fewer conveying screw elements at an end distal to the feed hopper, and wherein the number of said kneading elements is greater than the number of said conveying screw elements.

2. The screw extruder as in claim 1, wherein the drive shaft of the screw extruder mechanically cooperates with 2-lobe conveying screw elements and the one or more kneading elements contained within the channel of the extruder.

3. The screw extruder as in claim 1, wherein the drive shaft of the screw extruder mechanically cooperates with 3-lobe conveying screw elements and the one or more kneading elements contained within the channel of the extruder.

4. The screw extruder as in claim 1, wherein the screw extruder is divided into at least 12 sections of approximately equal length numbered in increasing sequential order away from the feed hopper.

5. The screw extruder as in claim 4, wherein the feed hopper is connected to one of two first sections to receive and convey a mixture comprising a resin, a neutralizing agent, and a surfactant via the series of one or more conveying screw elements at an end proximal to the feed hopper.

6. The screw extruder as in claim 4, comprising a series of one or more forward, reverse and neutral kneading elements in sections 6-9, wherein the helix angle of the kneading elements are from about 45° to about 90°, wherein the combination of kneading elements lengthen a residence time of colloidal dispersion within the screw extruder relative to a section comprising all forward kneading elements, and wherein the kneading elements promote intense dispersive mixing and lengthen a residence time to provide for accelerated reactions between the materials.

7. The screw extruder as in claim 4, wherein sections 3-5 comprise a series of one or more forward and neutral kneading elements, wherein the helix angle of the kneading elements are from about 45° to about 95°, wherein said series of one or more forward and neutral kneading elements mix the materials, which materials comprise a resin, a neutralizing reagent, a surfactant, and water.

8. The screw extruder as in claim 4, wherein sections 11 and 13 comprise forward flight screw elements, whereby rotation of the drive shaft facilitates mixing of the materials for the polycondensation stage and conveyance of the materials through the channel.

9. The screw extruder as in claim 1, wherein the at least one supply port is connected to at least one pump, wherein the supply port-pump combination enables the extruder to receive the materials at a controlled rate.

10. The screw extruder as in claim 1, wherein the at least one outlet port is connected to a condenser for removing water vapor and nitrogen from the channel.

11. The screw extruder as in claim 1, wherein the drive shaft is connected to a motor and wherein the rotation of the drive shaft spins at a rate of from about 50 rpm to about 1500 rpm.

12. A screw extruder configured for emulsification of resins, the screw extruder comprising:
   a feed hopper for receiving at least NaOH and resin, wherein the feed hopper is in communication with a flexible, elongated body member having at least one supply port and at least one outlet port, the at least one supply port connected to at least one pump, wherein the supply port-pump combination enables the extruder to receive the NaOH and resin at a controlled rate, and optionally the at least one outlet port is connected to a condenser;
   a series of one or more conveying screw elements positioned within the body member, wherein the conveying screw elements are rotatably moveable along a channel defining a longitudinal axis of the extruder;

a series of one or more forward, neutral, and reverse kneading elements interspersed between the conveying screw elements; and a motor connected to a drive shaft for rotating the conveying screw and one or more kneading elements along the channel;

wherein rotation of the conveying screw and kneading elements facilitate mixing of the NaOH and resin for a polycondensation stage, wherein there are one or more conveying screw elements between the one or more kneading elements and two or fewer conveying screw elements at an end distal to the feed hopper, and wherein the number of said kneading elements is greater than the number of said conveying screw elements.

13. The screw extruder as in claim 12, wherein the screw extruder is divided into at least 12 sections of approximately equal length numbered in increasing sequential order away from the feed hopper comprising a series of one or more forward, reverse and neutral kneading elements in sections 6-9, wherein the helix angle of the kneading elements are from about 45$20$ to about 90$20$, wherein the combination of kneading elements lengthen a residence time of colloidal dispersion within the screw extruder relative to a section comprising all forward kneading elements, and wherein the kneading elements promote intense dispersive mixing and lengthen a residence time to provide for accelerated reactions between the materials.

14. The screw extruder as in claim 12, wherein the drive shaft of the screw extruder mechanically cooperates with either 2-lobe or 3-lobe conveying screw elements and the one or more kneading elements contained in the extruder.

15. A method for producing latex emulsion in a continuous and solvent-less emulsification process, the method comprising:

feeding materials into a feed hopper of the screw extruder of claim 1 at a controlled rate, the screw extruder having a screw rotatably driven by a drive shaft along a channel;

melting the materials via dissipative mixing in the channel of the screw extruder;

injecting a first quantity of water to the materials melted and mixed together;

mixing the materials with a first series of one or more forward, neutral, and reverse kneading elements;

injecting a second quantity of water;

applying a second series of kneading elements; and recovering a colloidal dispersion via an outlet port of the screw extruder.

16. The method as is claim 15, wherein the materials include at least one resin, NaOH, and at least one surfactant.

17. The method as in claim 16, further comprising:

activating a neutralization reaction where the NaOH neutralizes the resin; and wetting the surfactant and resin to form a water in oil dispersion.

18. The method as in claim 15, further comprising lengthening a residence time of the colloidal dispersion within the screw extruder.

* * * * *